United States Patent [19]

Georgis

[11] Patent Number: 4,533,991
[45] Date of Patent: Aug. 6, 1985

[54] ADAPTIVE FEEDFORWARD SERVO SYSTEM

[75] Inventor: Steven P. Georgis, Boulder, Colo.

[73] Assignee: Storage Technology Corporation, Louisville, Colo.

[21] Appl. No.: 454,226

[22] Filed: Dec. 29, 1982

[51] Int. Cl.³ .............................................. G06F 15/46
[52] U.S. Cl. .................................... 364/164; 364/174; 318/561
[58] Field of Search ....................... 364/164, 165, 174; 318/561

[56] References Cited

U.S. PATENT DOCUMENTS

| | | | |
|---|---|---|---|
| 3,764,087 | 10/1973 | Paananen et al. | 242/186 |
| 3,836,833 | 9/1974 | Harris et al. | 318/270 |
| 3,851,157 | 11/1974 | Ellis | 364/165 |
| 3,958,109 | 5/1976 | Doherty et al. | 364/164 |
| 4,096,770 | 6/1978 | Tanner | 364/174 |
| 4,157,488 | 6/1979 | Allan | 318/7 |
| 4,214,300 | 7/1980 | Barlow et al. | 318/561 |
| 4,244,025 | 1/1981 | Alshuk | 364/165 |
| 4,250,543 | 2/1981 | Smith et al. | 364/165 |
| 4,295,171 | 10/1981 | Hirota et al. | 360/73 |
| 4,349,869 | 9/1982 | Prett et al. | 364/165 |
| 4,398,227 | 8/1983 | Anderson | 360/71 |
| 4,638,531 | 7/1977 | Loe, Jr. | 364/165 |

FOREIGN PATENT DOCUMENTS 712262 6/1965 Canada ................................ 364/164

OTHER PUBLICATIONS

"Time Optimal Control of Final Approach", Oswald, R. K., IBM Technical Disclosure Bulletin, vol. 20, No. 5, Oct. 1977.

Primary Examiner—Jerry Smith
Assistant Examiner—John R. Lastova
Attorney, Agent, or Firm—Bryant R. Gold

[57] ABSTRACT

A system and method of adaptively modifying the control signal of a servo system during a mode of acceleration or deceleration. An error accumulator, mean generator, and feedforward generator are used to generate a feedforward signal which modifies the control signal delivered to the servo motor. The feedforward signal for a given mode of operation is determined by the mean error during the previous operation in the mode and by the feedforward signal used during the previous operation in the same mode. Each subsequent operation in the same mode improves the feedforward signal until the mean error is minimized.

11 Claims, 4 Drawing Figures

ADAPTIVE FEEDFORWARD SERVO SYSTEM

BACKGROUND OF THE INVENTION

This invention relates to a servo system which utilizes an adaptive feedforward signal to reduce the mean error as the servo motor is being accelerated or decelerated. More particularly, this invention relates to the use of an adaptive feedforward signal in a servo system which allows the servo system to be designed for maximum stability and accuracy using a low gain servo loop, reduces power consumption, eliminates the need for manufacturing or field calibration to reduce the error, and reduces the variation in performance from servo system to servo system.

There are many applications where a servo motor is required to accelerate or decelerate at a constant rate for a brief period of time. Typically, in such applications, it is also required that the angular velocity and angular displacement be at predefined values at the end of the period of acceleration or deceleration.

A capstan servo system, which drives the magnetic tape past the read/write heads on a magnetic tape system, is an example of a servo system that has the above requirements. The period of acceleration, the angular displacement during this period and the angular velocity at the end of this period all determine, among other things, the gap between data records written on the tape. If sufficient variations exist in the capstan acceleration, velocity, or displacement parameters, tapes written on one system may not be readable on another system.

The acceleration of a DC servo motor is proportional to the amount of current through the motor. Thus, a typical servo system, with the requirements described above, consists of a current source which supplies a square wave shaped pulse of current to the motor. The rise and fall times of the square wave are not instantaneous but are short compared to other times of the system. The magnitude, polarity, and width of the current pulse are such as to realize the desired acceleration for the desired length of time.

Because of the physical characteristics of the motor and the mass being rotated, e.g., friction, inertia, viscosity, etc., the motor will not accelerate as desired. Therefore, the servo system uses "feedback", i.e., a measurement is made of a specified parameter such as the angular velocity or angular displacement of the motor, and this measured value is fed back and compared to a reference value. The error between the measured and desired values is then used as a correction signal that controls the motor so that corrective action can be taken to minimize the error. This type of corrective system (wherein a measured value is feedback and compared to a reference signal) is commonly referred to as a "closed loop" system.

The servo system employs circuitry that generates a signal corresponding to the desired angular velocity or angular displacement versus time. Since the current input is a step function, and since velocity is the integral of acceleration, a simple integrating circuit, with the correct values, can integrate a step function to generate a ramp function corresponding to the desired angular velocity. Similarly, displacement is the integral of velocity. Therefore, a two stage integrating circuit can generate a parabolic curve from a step function corresponding to desired angular velocity.

As explained, the measured feedback signal is subtracted from a generated (desired) reference signal to produce an error signal. This subtraction is either done continuously or on a sampling basis. The error signal is used, again either continuously or at the sampling times, to correct the current input to the motor. The correction is done in a manner that attempts to reduce the error signal to zero.

Unfortunately, this type of closed-loop servo system, though common in the prior art, has several inherent disadvantages. A trade-off exists between the accuracy of the system and the stability of the system. To illustrate, in order to achieve good accuracy, fast transient response, and a high rejection of external disturbances, the gain of the loop must be relatively high. As a general rule, as the gain is increased, the accuracy, response time, and rejection capabilities are also improved. However, as the gain is increased, the stability of the system decreases. Thus, as the gain is increased, the system exhibits an increasingly oscillatory response until the point is reached where the system is purely oscillatory and uncontrollable. Unfortunately, it is possible that the accuracy requirements of the system cannot be met while maintaining the stability requirements.

Another disadvantage of this type of system is that it must be manually calibrated or adjusted when manufactured to insure that the acceleration, velocity, and displacement characteristics meet design specifications. If any maintenance is performed, additional calibration may be required. Also, as the equipment ages, characteristics such as friction and viscosity will likely change, thereby requiring periodic calibration of the servo system in order to maintain specified performance levels. In the case of a capstan motor used in a magnetic tape system, all magnetic tape systems must have the same acceleration, velocity, and displacement characteristics, within defined tolerance limits, to guarantee interchangeability of tape spools between systems.

SUMMARY OF THE INVENTION

It is an objective of the present invention to provide a servo system in which the magnitude of the error signal is reduced, thereby reducing the magnitude of the corrections that must be made.

It is a further object of the present invention to provide such a servo system that is designed for maximum stability and accuracy using a low gain loop.

Still another object of the invention is to provide such a servo system that reduces power consumption, eliminates manual adjustment or calibration, and minimizes the effects of parameter variations between different servo systems caused by aging or wear.

The above and other objects of the invention are realized by using a feedforward signal which corrects the magnitude of the current supplied to the motor. As the motor is accelerated or decelerated, the mean error of the error signal during that mode of operation (acceleration, or deceleration is determined and stored. During the next operation in the same mode, the feedforward signal is adapted or modified, dependent upon the mean error previously determined, so as to reduce the error signal used in the closed loop system. Thus, after several operations in a given mode, the adaptive feedforward signal reduces the magnitude of the error signal, and the desired servo accuracy is achieved without affecting servo stability. Further, because the error signal is minimized, a low gain loop can be employed, and power consumption is reduced. Moreover, because the feedforward signal "adapts" depending upon mean errors previously measured, the effects of parameter variations (whether attributable to a different system or to aging or wear) will be included in the adaptive feedforward compensation.

BRIEF DESCRIPTION OF THE DRAWINGS

A complete understanding of the present invention and of the objectives, features and advantages described above can be better obtained from the following description of the preferred embodiment, presented in conjunction with the accompanying drawings, wherein.

DESCRIPTION OF THE PREFERRED EMBODIMENT

The following is a description of the best presently contemplated mode of carrying out the present invention. The description is given only to illustrate the principles, objectives, features and advantages of the present invention and is not to be taken in a limiting sense. The true scope of the invention can be ascertained by referring to the appended claims.

Figure 1:
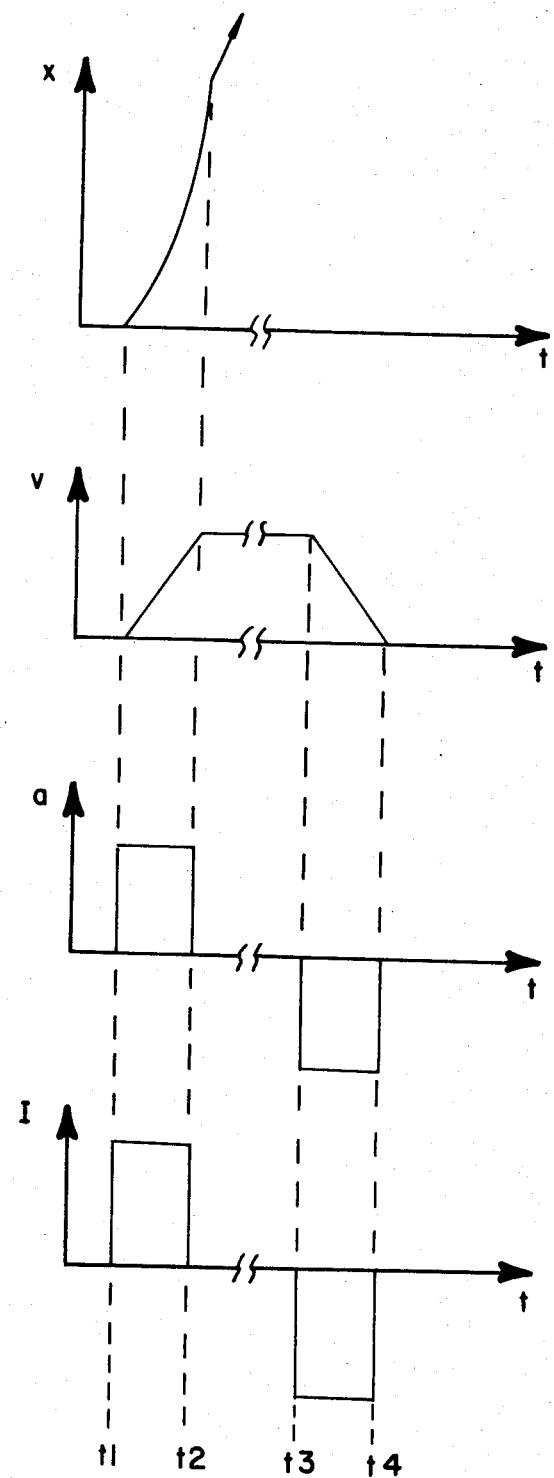
FIG. 1 shows graphs of current, acceleration, velocity, and displacement versus time for an ideal servo system.

FIG. 1 depicts the response of an ideal servo motor to a current input, I. Included in FIG. 1 are the acceleration, a, angular velocity, v, and displacement, x, responses of the ideal servo motor in an ideal servo system. All curves are plotted against time.

The current, I, is shown in FIG. 1 as a positive step between times t1 and t2 and a negative step between times t3 and t4. The acceleration, a, being proportional to the current, has a constant acceleration between times t1 and t2 and a constant deceleration between times t3 and t4.

The velocity, v, being the integral of the acceleration, is a ramp with positive slope between t1 and t2, and a ramp with negative slope between t3 and t4.

The displacement, x, being the integral of the velocity, has a parabolic shape between t1 and t2. Betwen t2 and t3, the displacement curve would be a ramp as long as the velocity is constant. Since the displacement is a continually increasing function with velocity, it is not shown in FIG. 1 beyond t2.

Because of the physical characteristics of the motor and mass being rotated, as explained previously, the acceleration, velocity, and displacement curves of a physical servo system will not be the same as those of the ideal system shown in FIG. 1. Rather, all three curves will have irregularities as the servo system attempts to keep the error signal at zero.

Figure 2:
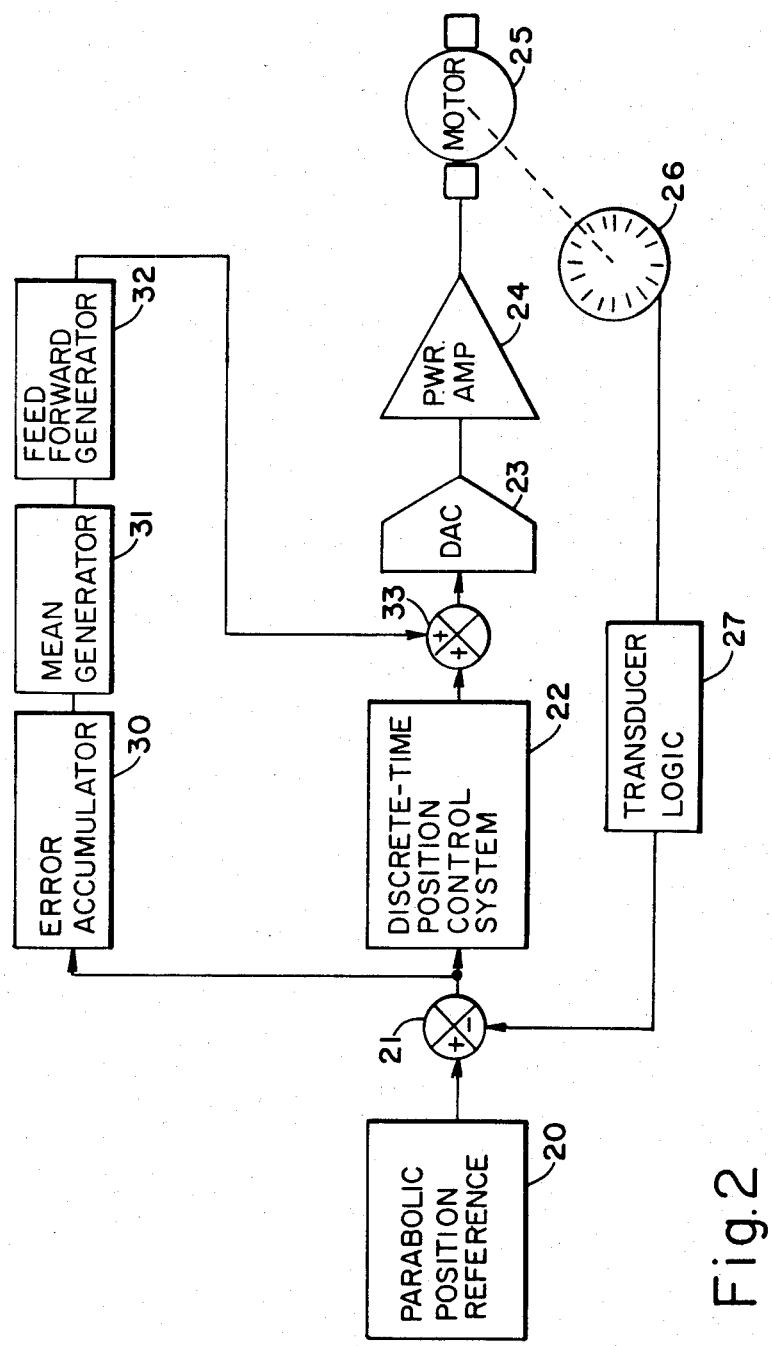
FIG. 2 is a block diagram of a servo system wherein the present invention is used.

FIG. 2 is a block diagram showing a closed loop servo system employing the present invention. The closed loop servo system comprises blocks 20–27 and should be considered part of the prior art. The system shown uses position feedback in the loop. The position signal is provided by the shaft encoder 26 and the position error signal is generated by the summing element 21. The operation and performance of the closed loop servo system 20–27 is well understood and documented by those skilled in the art.

The system shown in FIG. 2 is a digital system controlled by a clock (not shown in the figure). When the system is being used in an acceleration or deceleration mode, the output of the transducer logic 27, (the measured angular position), and the output of the parabolic position reference 20, the desired angular position, are sampled at predetermined clock periods and fed to the summing network 21 to produce an error signal. The discrete time position control system 22 uses this error signal to change the input to the digital to analog converter (DAC) 23. The DAC 23 supplies a different voltage to the power amplifier 24, thereby changing the current supplied to the motor. Thus, at each sampling time a correction is made to the current delivered to the motor in an attempt to make the next sampled position equal to the next sampled desired position, i.e., make the error signal zero.

The adaptive feedforward signal of the present invention is produced in the feedforward path made up of the error accumulator 30, the mean generator 31, and the feed forward generator 32. The error accumulator 30 also reads the error signal at each operation. (A particular mode of operation, such as an acceleration mode, will last for many sampling times.) The mean generator 31 determines the value of the mean, or average, error that occurred during that mode of operation. This mean error value is saved or stored for future reference. The feedforward generator 32 then generates a feedforward signal, also saved for future reference, that is based upon the mean error value determined during the last operation in that mode. Thus, the feedforward signal is "adapted" to conform to the characteristics of the system. The feedforward signal is added to the output of the discrete-time position control 22 by the summing network 33, modifying the current to be sent to the motor.

The operation of the system can be thought of as follows: an error causes a correction and a correction causes an error. The feedforward signal, being based on the mean error of the previous operation in a particular mode of acceleration or deceleration, is added to the correction in an attempt to reduce the mean error during the present mode of operation. The first time the servo is operated in a particular mode, the mean error may be relatively high. On each subsequent operation in that mode, the adaptive feedforward signal will reduce the mean error until it has been reduced to a minimum.

When a low mean error is realized a low gain loop can be used, reducing power consumption. Moreover, the servo system can be designed for maximum stability. Once assembled and tested, the adaptive feedforward signal will automatically calibrate the system by reducing the mean error to a minimum. If all servo systems are manufactured and tested to the same standards, then the adaptive feedforward signal assures that the variation from system to system can be held to a prescribed standard.

Figure 3:
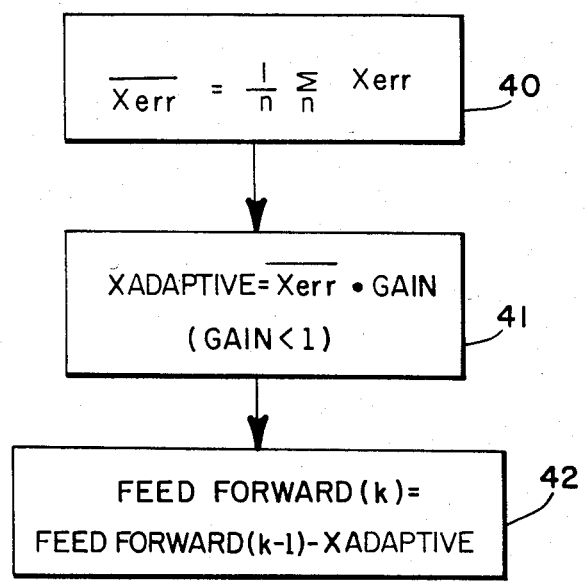
FIG. 3 is a simplified flow chart showing how the feedforward signal of the present invention is generated.

The error accumulator 30, mean generator 31 and feed forward generator 32 of the present invention are implemented, in the preferred embodiment, by a microprocessor. FIG. 3 is a flow chart of the steps used by the microprocessor to realize the generation of the feedforward signal. In the preferred embodiment of the invention, a Z80 type of microprocessor, available commercially from Zilog, Mostek and other manufacturers, is used to control a tape subsystem, such as the 2920 Tape Subsystem manufactured by Storage Technology Corporation. Attached hereto as Appendix A and incorporated herein by reference is a "pseudocode" rendition of the method of the invention. This pseudocode includes both actual microcode instructions and documentary notes so as to enable one other than the original programmer to understand the program used to generate the feedforward signal. Those skilled in the art, given the incorporated documentation, would have no difficulty in practicing the present invention.

Referring to the simplified flow chart of FIG. 3, it is seen that in block 40 the mean error value is generated by summing all the sampled errors and dividing the sum by the number of samples. An adaptive term is then generated by multiplying the mean error by a gain factor. The gain factor is less than one for the following reasons: (1) the sampled error is a binary number that has an inherent possible error of plus or minus the least significant bit; (2) the intent of the invention is to reduce the error signal, therefore, the least significant bit can be a significant part of the measured value; and (3) by multiplying by a factor less than one, the effect of the least significant bit on the adaptive term is reduced. In the preferred embodiment, the gain is set at 0.75.

The feedforward signal is determined as shown in block 42 of FIG. 3. The present feedforward signal (k), i.e., the feedforward signal to be used on the next operation in the given mode, is found by adding the adaptive signal previously calculated to the last feedforward signal (k-1), i.e., the feedforward signal used during the last operation in the given mode.

It should be pointed out that the description presented herein of the preferred embodiment has described a servo system using position control. Other embodiments exist which use velocity control. The present description would apply to such embodiments if: in FIG. 2, a velocity transducer is used instead of a position transducer (either a shaft encoder or a tachometer could be used as a velocity transducer), the parabolic position reference 20 is changed to a ramp position reference, and the discrete time position control system 22 is changed to a discrete time velocity control system; in FIG. 3, the term X is changed to V; in the text, the terms position and displacement, when used in regard to the feedback loop and error signal, are changed to velocity.

Figure 4:
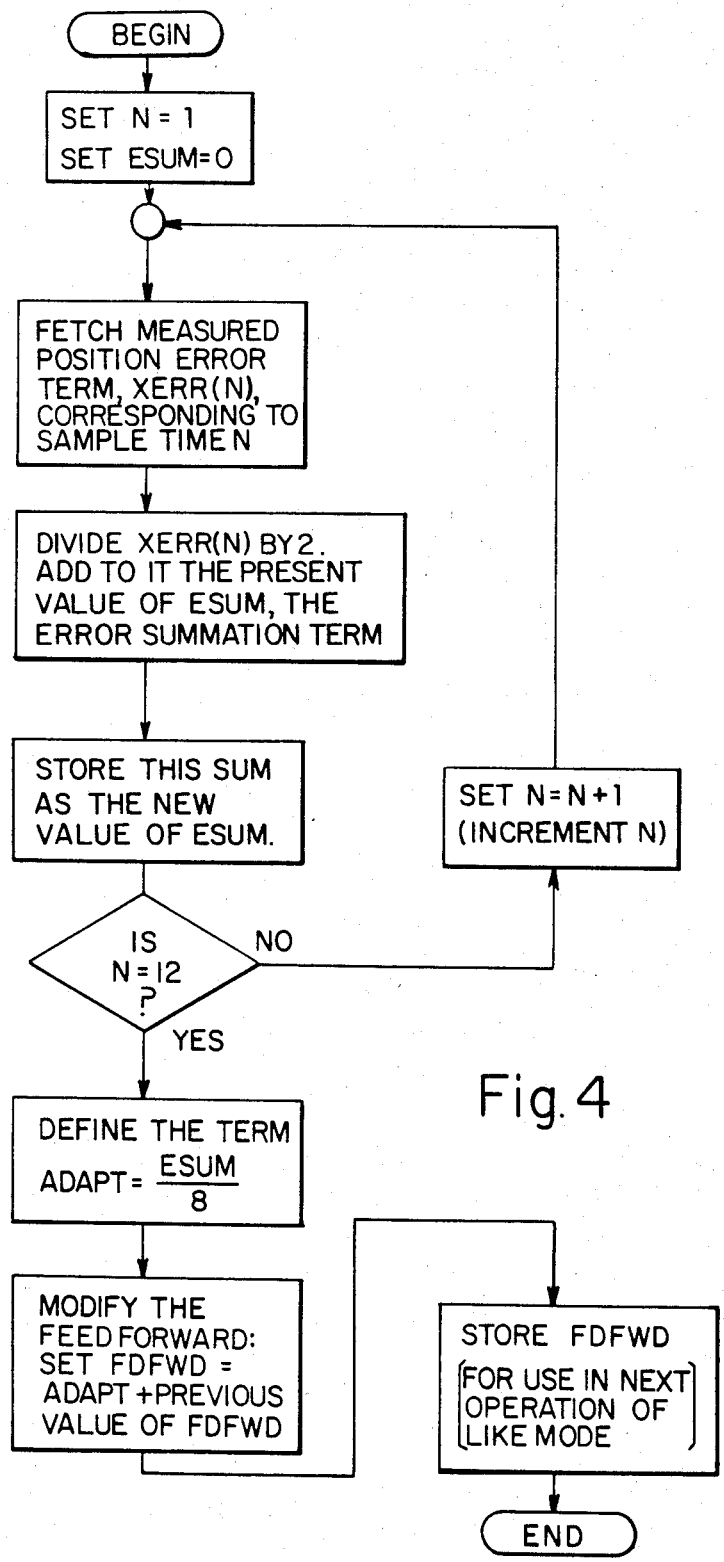
FIG. 4 is a more detailed flow chart of FIG. 3.

FIG. 4 is a more detailed flow chart of the process used by the present invention to carry out the steps summarized in FIG. 3. It is noted that the steps used in the pseudocode listed in Appendix A correspond to the steps shown in FIG. 4. In FIG. 4, N is a sample index. The signal XERR(N) is the position error at sample time N. The term ESUM is the error summation term; the term ADAPT is the adaptive term; and the term FDFWD is the feedforward term. The gain term is set as 12/16=0.75. (That is, a sum is accumulated for N=12 samples, and a divide-by-16 operation is performed.) The divide-by-16 operation is split into two components: a divide-by-two operation performed on each sample, and a divide-by-eight operation performed on the accumulated sum. Advantageously, the divide-by-two loop reduces the numerical sensitivity to quantization noise in the least-significant bit for each position error sample. The divide-by-eight operation then reduces the overall gain to the desired value of 0.75.

APPENDIX A

```
STC SECRET
** ******************************************** **
*                                                 *
```

APPENDIX A-continued

```
* Z-80 SUBROUTINES FOR ADAPTIVE                   *
*           FEEDFORWARD                           *
*                                                 *
*  THESE SUBROUTINES ARE CALLED BY THE            *
*  MAIN SERVO CONTROL PROGRAM. INITADAP ,         *
*  THE INITIALIZATION STEP, IS CALLED AT THE      *
*  BEGINNING OF ANY CAPSTAN ACCELERATION          *
*  OR DECELERATION OPERATION. ADAPT IS            *
*  CALLED ONCE DURING EACH SAMPLING IN-           *
*  TERVAL TO PROCESS THE ERROR TERM               *
*  FROM THAT INTERVAL. WHEN 12 SAMPLES            *
*  ARE ACCUMULATED, PROGRAM FLOW JUMPS            *
*  TO ADAPT2 WHICH COMPUTES THE SCALED            *
*  MEAN ERROR WHICH IS USED TO MODIFY             *
*  (ADAPT) THE FEEDFORWARD TERM, FDFWD.           *
*  AFTER THE PROCESS IS COMPLETE, FDFWD IS        *
*  IS SAVED AND THE PROGRAM RETURNS TO THE        *
*  MAIN SERVO CONTROL PROGRAM BODY.               *
*                                                 *
** ******************************************** **
*                                                 *
* INITIALIZATION SUBROUTINE

INITADAP  EQU $
          SUB A           CLEAR ACCUMULATOR
          LD (ESUM),A     ZERO ESUM (ERROR SUM-
                          MATION TERM)
          INC A           SET A=1
          LD (N),A        STORE 1 IN N (SAMPLE
                          INDEX)
          RET             RETURN FROM THIS SUB-
                          ROUTINE
*
* ADAPTIVE FEEDFORWARD ROUTINE - FIRST PART
  IS ERROR SUMMATION
*
ADAPT     EQU $
          LD A,(XERR)     LOAD CURRENT POSI-
                          TION ERROR TERM
          SRA A           DIVIDE BY 2 (TO FILTER
                          LSB QUANTIZATION
                          NOISE)
          ADD A,(ESUM)    ADD TO PRIOR ERROR
                          SUM
          LD (ESUM),A     SAVE AS NEW ERROR
                          SUM
*
          LD A,(N)        LOAD SAMPLE INDEX
          CP 12           12 SAMPLES YET?
          JP Z,ADAPT2     IF YES, JUMP; IF NO,
                          CONTINUE
          INC A           INCREMENT SAMPLE IN-
                          DEX COUNT
          LD (N),A        SAVE SAMPLE INDEX
          RET             RETURN FROM THIS SUB-
                          ROUTINE
*
* COMPUTE SCALED MEAN ERROR AND MODIFY THE
  FEEDFORWARD TERM
*
ADAPT2    LD A,(ESUM)     LOAD ERROR SUM-
                          MATION
          SRA A           DIVIDE BY 2
          SRA A           DIVIDE BY 2
          SRA A           DIVIDE BY 2
*                         A NOW CONTAINS 0.75 *
                          MEAN ERROR
          ADD A,(FDFWD)   ADD SCALED MEAN
                          ERROR TO PRESENT
                          FEEDFORWARD
          LD (FDFWD),A    SAVE NEW VALUE OF
                          FEEDFORWARD
          RET             RETURN FROM SUB-
                          ROUTINE
*
```

What is claimed is:

1. A method of controlling a desired parameter, such as angular position or angular velocity, of a movable body such as a motor shaft, during a mode of acceleration or deceleration comprising the steps of:

(a) generating, for the selected mode of operation, a first signal for controlling the movement of said movable body during said selected mode of operation;

(b) applying said first signal to drive means coupled to said movable body to accomplish said selected mode of operation;

(c) generating a plurality of reference values representing the desired value of a selected parameter associated with said movable body, such as angular position or velocity, at predetermined time periods during said selected mode of operation;

(d) measuring, at each of said predetermined time periods during said selected mode of operation, the actual value of said parameter associated with said movable body;

(e) comparing said actual parameter value to said desired parameter value at each of said predetermined time periods and generating a digital parameter error signal representing the difference between said two values at each of said predetermined times;

(f) dividing said digital parameter error signal by a first fixed number having a value of at least two, whereby the sensitivity of a least significant bit within said digital parameter error signal to noise is reduced;

(g) summing the divided digital parameter error signals generated in step (f) over a prescribed number of said predetermined time periods to form an error sum signal;

(h) dividing the error sum signal of step (g) by a second number to generate an adaptive error signal, the product of said first and second numbers being greater than the prescribed number of time periods over which said error signals are summed in step (g);

(i) applying said adaptive error signal generated in step (h) to said first signal generated in step (a) to correct for the average parameter error, as determined in steps (e)–(h), during said selected mode of operation; and (j) repeating steps (c)–(i) as needed throughout said selected mode of operation so as to regularly update said first signal with the latest average parameter error information associated with said selected mode of operation.

2. The method of claim 1 wherein the prescribed number of time periods is equal to twelve, the first fixed number is two, and the second number is eight.

3. The method of claim 1 wherein at least steps (g) and (h) are carried out under control of a microprocessor.

4. The method of claim 1 wherein the parameter to be controlled is the angular position of a capstan of a tape drive subsystem.

5. The method of claim 1 wherein the parameter to be controlled is the angular velocity of a capstan of a tape drive subsystem.

6. A system for adaptively modifying a control signal delivered to a movable body during a mode of acceleration or deceleration of said body, said control signal being generated by a closed loop system that includes measuring means for making discrete measurements of a desired parameter at predetermined times, such as position or velocity associated with said movable body, comparison means for comparing each of said discrete measured parameters with respective reference parameters and generating a set of sampled error signals indicating the difference between the discrete measured parameter and the respective reference parameter at the predetermined time, control means for generating said control signal as a function of said sampled error signals, and drive means, responsive to said sampled error signals for causing said body to move, said system for adaptively modifying said control signal comprising:

means for accumulating an error value representative of the accumulated value of said sampled error signal during said acceleration or deceleration mode, said error accumulating means comprising first dividing means for dividing said sampled error signals by a first fixed number having a value of at least two to produce respective divided sampled error signals, and summing means for summing, in real time, said divided sampled error signals, said summing means thereby generating an accumulated error value of said divided sampled error signals;

means for determining an average error value of said accumulated error value comprising second dividing means for dividing said accumulated error value by a second number, the product of said first and second numbers being greater than the number of sampled error signals included within said accumulated error value;

means for generating a feedforward signal that is a function of said average error signal; and means for combining said feedforward signal with said control signal so as to reduce said error signal.

7. The system as defined in claim 6 wherein the feedforward signal for the present mode of operation is equal to a feedforward signal from a most recent same mode of operation plus an adaptive term, said adaptive term comprising the average error signal from the present mode of operation.

8. The system as defined in claim 7 wherein said combining means comprises summing means for adding said feedforward signal to said control signal.

9. The system as defined in claim 6 wherein said error accumulating means, error averaging means, and feedforward signal generating means are realized in a microprocessor.

10. The system as defined in claim 9 wherein said moveable body comprises a tape capstan and the parameter to be controlled is the angular position of said tape capstan.

11. The system as defined in claim 9 wherein said moveable body comprises a tape capstan and the parameter to be controlled is the angular velocity of said tape capstan.

* * * * *